July 23, 1935.                H. RUMSEY, JR                2,008,837
                    ART OF PACKAGING PLASTIC SUBSTANCES
                         Filed June 16, 1933        2 Sheets-Sheet 1
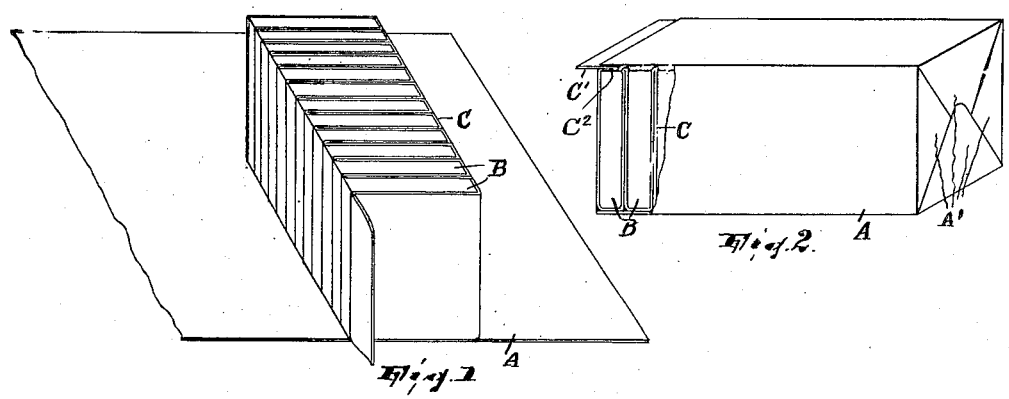
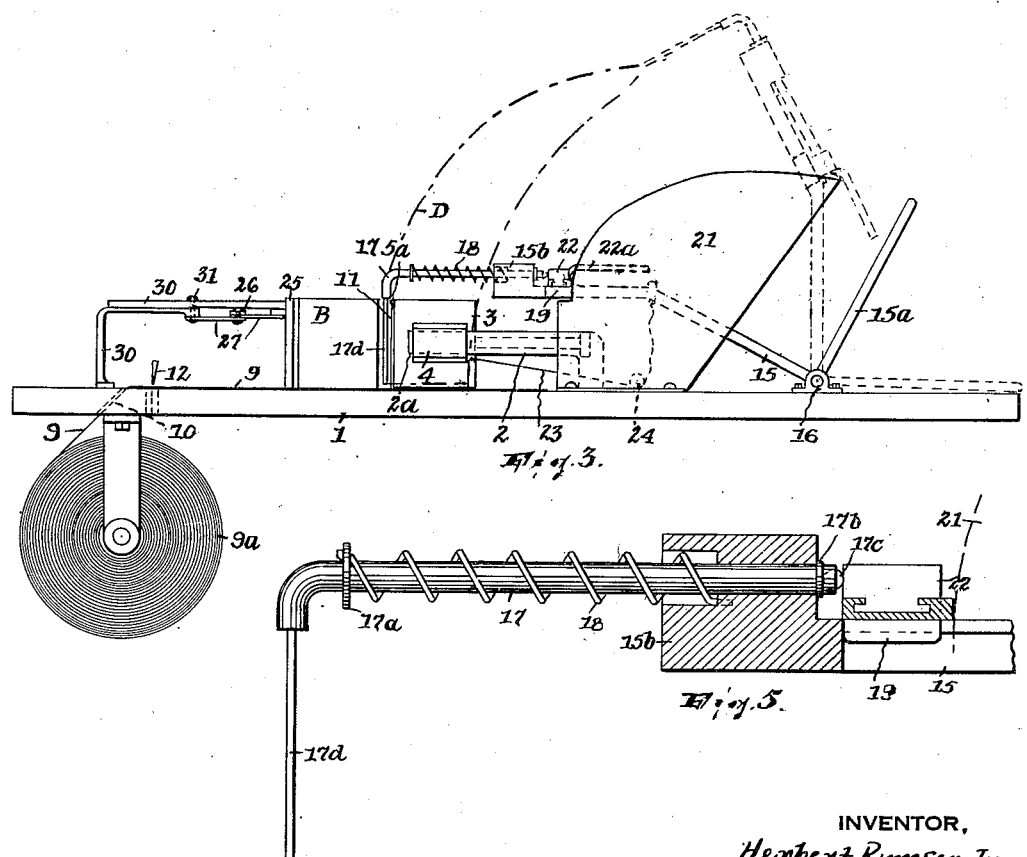
INVENTOR,
Herbert Rumsey, Jr.,
BY
ATTORNEY July 23, 1935.  H. RUMSEY, JR  2,008,837
ART OF PACKAGING PLASTIC SUBSTANCES
Filed June 16, 1933   2 Sheets-Sheet 2
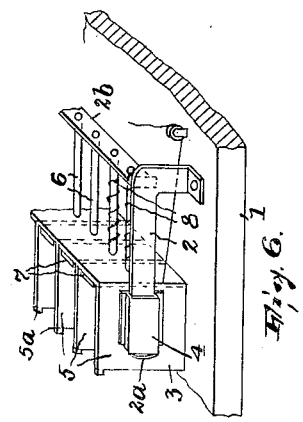
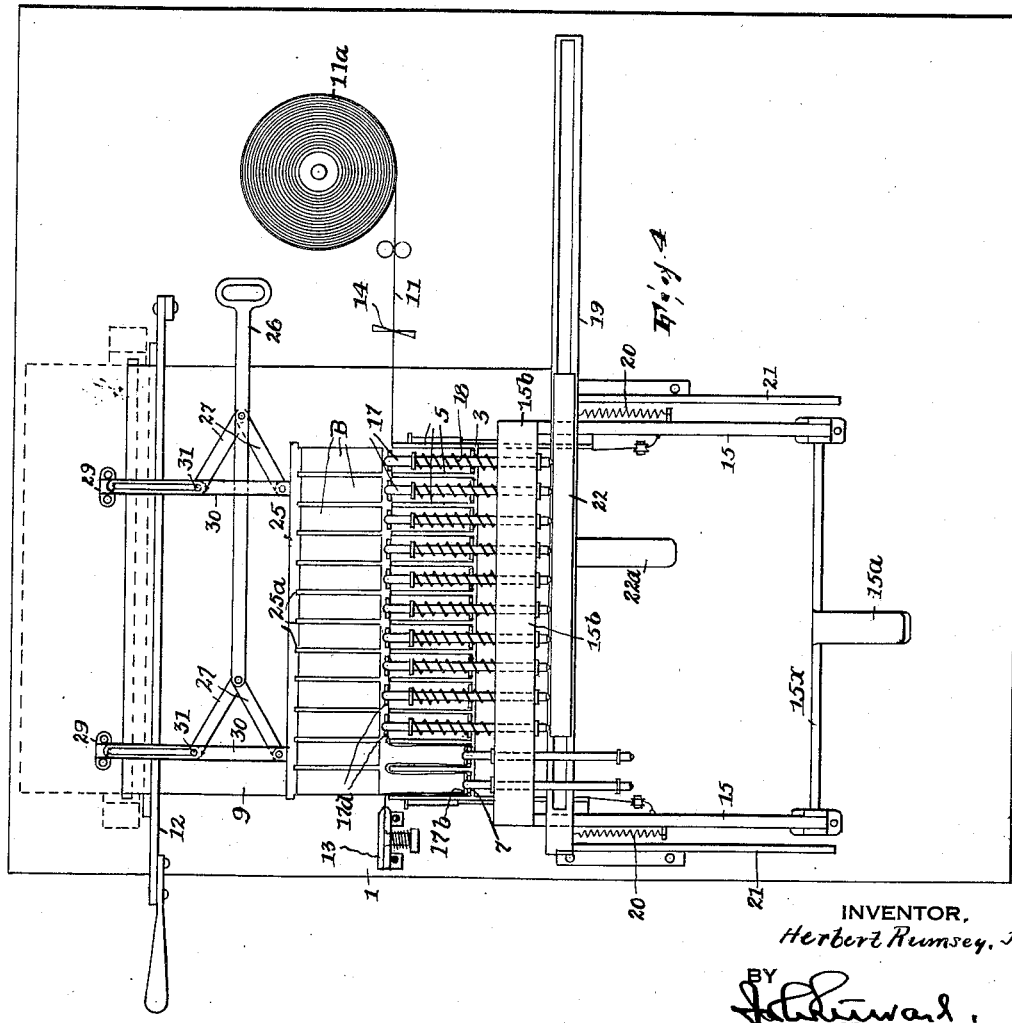
INVENTOR,
Herbert Rumsey, Jr.
BY
ATTORNEY Patented July 23, 1935

2,008,837

UNITED STATES PATENT OFFICE 2,008,837

ART OF PACKAGING PLASTIC SUBSTANCES

Herbert Rumsey, Jr., Nutley, N. J.

Application June 16, 1933, Serial No. 676,080

16 Claims. (Cl. 93—2)

In my Patent No. 1,838,000 I have disclosed a filler consisting of a series of plastic and more or less adhesive articles (there minced meat) and a strip of flexible sheet material formed with folds which alternate with the articles, whereby when the filler is contained in a container open at one end of the filler the corresponding end of the strip may be utilized, by pulling upon it, to withdraw the articles one by one. In order to form this filler I proposed in my Patent No. 1,849,438 to form the folds in the strip, cause the folds to straddle the partitions between the spaces of a mold, leaving each space lined by the portion of the strip between its folds, and then introduce plastic material into said spaces, the plastic mass being divided by the partitions as it was introduced.

According to the present invention I propose to form a filler, or as I herein term it a "pack", in a different way which has been devised with a view to the nature (different from that of minced meat as to adhesiveness, plasticity and other qualities) of butter or similar material which is to form the said articles. It is found impractical to discharge such material as a single flowing mass or stream into the lined mold so as to be divided by its partitions and then cut off the material, all in a way so as also to leave the articles nicely formed or squarecut, wherefore, having the articles already formed as cakes or pats, a flexible strip is first tucked into the several spaces of the mold in a novel way and then the articles are introduced into the thus-lined mold spaces. The forming of the pack preferably takes place so that those faces of the articles which correspond to one edge of the strip are presented to a sheet to which said faces may adhere and which may serve, when wrapped about the pack, as its wrapper or container.

In the annexed drawings:

Fig. 1 is an isometric view of pats or cakes of plastic and somewhat adhesive material, as butter, having the folds of a zig-zag liner strip interleaved between them, the mass thus produced resting on a wrapper which is shown broken away;

Fig. 2 shows the mass comprising the pats and liner strip wrapped in the wrapper, again partly broken away;

Fig. 3 is a side elevation of the present apparatus;

Fig. 4 is a plan thereof;

Fig. 5 is a side elevation of one of the tuckers and shows in section the mounting for and a controller controlling the tuckers; and Fig. 6 is a fragmentary perspective view showing the bed, the mold and its supporting means and the mold ejectors.

A bed or fixed support 1 has brackets 2 on whose horizontally extending arms is slidable lengthwise thereof a mold 3 which is somewhat spaced from the bed, the mold having loops 4 at both ends which are penetrated by the arms and form guides for the mold; there is a stop 2a at the free end of each arm of the brackets.

The mold 3 is open at the top, bottom and front (or left in Fig. 3) and is a rectangular shell having a number, as eleven, vertical equally spaced walls 5 which extend forwardly from its back wall, each preferably having an overhang 5a at its front edge, the spaces between the walls forming cells into which the mentioned strip is to be tucked to form pockets or tucks to receive the plastic material.

Corresponding to each mold space or cell is an ejector which here consists of a rod 6 fixed to a cross-bar 2b of the bracket 2 and freely penetrates the back wall of the mold and at its forward end has a vertical ejector blade 7 occupying such mold space. The mold is normally urged forwardly to a limit, determined by the engagement of the loops 4 with the stops 2a, by springs 8 which are coiled about some of the rods 6, as the two outer ones at each end of the series, and interposed between cross-bar 2b and the mold.

Having drawn a portion of a sheet 9 from a roll 9a thereof beneath the bed (the sheet extending through a slot 10 in the bed) rearward over the bed and under the mold, which portion is to form the wrapper A, and having placed a row of pats or cakes B on said portion between the mold and a plunger to be hereafter referred to, and having drawn a portion of a flexible strip 11 from a roll 11a thereof lateral of the bed between the pats and the mold and under the overhangs 5a, which portion is to form the liner or liner strip C, such latter portion is by a progressive action to be tucked into the mold spaces between walls 5, then the plunger is to function to push the pats into the lined mold spaces—the tucking means meanwhile withdrawing from such spaces—and finally the mold is to be retracted, leaving the interleaved or interlined pats discharged and during this operation stationary on the mentioned portion of wrapper sheet 9. The sheet 9 is drawn from its roll the appropriate distance by hand and at the proper time is to be severed by a (here) manually operated shear 12. The sheet 11 may likewise be drawn from its roll by hand but its free end should be held in some way while the tucking is being done; this holding may be by hand or effected by any suitable clip 13 (shown only in Fig. 4) which is made to grip its said end. At 14 is a manually operated shear for this sheet. Describing, now, the mechanism for effecting the tucking, the charging of the lined mold and the retraction of the mold from the mass of lined pats:

An up-and-down movable carrier 15, here in effect a lever fulcrumed in bearings 16, comprises two arms arranged in parallel front-to-rear planes and a handle 15a for effecting its movements extending from the shaft 15x of the carrier. It carries, each movable lengthwise of its arms, a series of tuckers. Each tucker comprises a stem 17 which penetrates the cross-bar 15b of the carrier and has collars 17a—17b which limit its said motion and in its rear end a freely revoluble ball 17c, its forward end having a downwardly extending tucker blade 17d. Connecting the forward collar of the stem and the cross-bar is a spring 18 coiled about the stem which normally urges the tucker to its rearward limit— where the collar 17a impinges against the cross-bar.

A carriage in the form of a bar 19 is slidable on and lengthwise of the arms of the carrier 15, being normally urged rearward, by springs 20 (Fig. 4) connecting it with said arms, against cams 21 which are fixed to the bed both sides of said carrier. On this carriage is slidable crosswise of the carrier a controller or slide 22 having a handle 22a and which, when the carrier is depressed (Fig. 3), is back of and serves temporarily to prevent retraction of the tuckers by their springs 18.

The mold is connected at each end to the adjoining arm of the carrier by flexible connections 23 which extend under pulleys 24 and are somewhat slack when said carrier occupies the depressed or full-line position of Fig. 3.

The mentioned plunger, 25, is a plate arranged in a vertical plane parallel with the mold and slidable toward and from the same in contact with the sheet A. So that it may enter the mold spaces somewhat it has vertical grooves 25a formed in its rear face to coincide with the mold partitions. The plunger 25 may be moved toward and from the mold in any way, as by the hand-bar 26 which is connected to the pivots by which the links 27 in each of two pairs of links 28 are connected together, one link in each pair being connected to the plunger and the other to a standard 29. A pair of guide arms 30 projecting rigidly forwardly from the plunger and overlying the links receive in longitudinal slots shown therein in Fig. 4 the studs 31 by which the relatively forward links are pivoted to said standards. Any other means which insures rectilineal movement of the plunger and its being kept in all positions parallel with the mold, to the end that it will push the pats or cakes all simultaneously to their limits in the mold spaces and its grooves will register with the mold walls 5, will serve.

Operation.—Assume the parts to be in their positions shown by Fig. 4, to wit, the mold 3 is in its left-hand position or forward; the tuckers 17 are held forward against the tension of springs 18 by the cams 21 acting through carriage 19 and controller or slide 22; the plunger 25 is forward; the sheet 9 has been drawn rearward under the mold; and the strip 11 has been drawn across the mold and is held by the clip 13, extending between the mold and the blades of the tuckers.

If now the controller is drawn to the right in Fig. 4 it will release the tuckers successively so that they will be drawn successively into the pockets of the mold by their springs and consequently draw the strip into the pockets in a succession of tucks, roll 11a unrolling to afford the required let-off. Plunger 25 is now, by operating hand-bar 26, made to push the pats B, which have meanwhile been placed on sheet 9 between the plunger and mold so as respectively to register with the now lined pockets, into the latter, and, after the pats enter the pockets but preferably when they are sufficiently nearly home therein not to be interfered with by the tuckers when they rise, carrier 15 is raised to the dotted-line position, Fig. 3, to clear the tuckers from the pockets, incidentally withdrawing the mold through the connections 23 so that, by the stationary ejectors 7, the interlined pats are stripped from the mold, standing stationary in that operation on the sheet 9. Said sheet and the strip being now cut off and the strip detached from clip 13 the interlined pats are wrapped in the wrapper A formed by the cut-off part of the sheet as will hereinafter appear.

When the carrier was raised the cams 21 permitted the carriage 19, under the pull of its springs 20, to move sufficiently toward the axis of the carrier to allow the controller to be returned (toward the left in Fig. 4) behind the tuckers, now held retracted by their springs 18 so that their collars 17a abut the carrier cross-bar 15b. The controller is now so returned and when the carrier is again depressed the cams, acting through the carriage and controller, as before, will reset the tuckers in the position of Fig. 3 or so that the strip 11, which has again been drawn across the mold (now allowed again to resume its forward position), will extend between them and the mold; meanwhile, of course, the sheet 9 has been again drawn forward under the mold, the plunger 25 retracted, and upon placing another series of pats B on said sheet as before the operation may be repeated.

The wrapping shown in Fig. 2 is effected as follows: It will be noted that one end of the lined mass is flush with one side edge of the wrapper (see also Fig. 4, where one edge of wrapper sheet 9 is approximately coincident with one end of the mold) whereas the other side edge portion of the wrapper projects beyond the corresponding end of the mold and hence the row of pats. Also that the end of the strip 11 which was held by clip 13 projects from said pack. The operator folds the end portions of the wrapper which flank said pack around the latter and then folds the mentioned projecting edge portion of the wrapper in conventional folds A' over its adjoining end. The projecting end, C', of the liner formed from strip 11 in the wrapping is tucked in a fold C2 between the wrapper and the lined mass. Thus all sides of the pack are covered on the wrapping and when the first pat is required the end C' is pulled out and by a further pull is made to eject the pat in substantially the manner indicated in my Patent No. 1,838,000, the others following on succeeding pulls. I reserve the package shown in Fig. 2 for another application to be filed by me.

In place of employing tucking elements which in clearing the mold spaces after the tucking operation return by the paths by which they entered said spaces, which is known, my tuckers return to the position for effecting the next subsequent tucking operation by paths different from those by which they pass through the spaces for tucking—that is, they withdraw from behind the pats after tucking by openings (here their top openings) which face in a direction angularly related to the direction in which their mouths open—which not only permits the pats to be entered while the tuckers are still in said spaces, thus avoiding a wasted time-interval, but makes it possible to have the tuckers maintain or hold the tucks in the mold spaces at least until the pats have entered the lined spaces and if desired until they are more or less home therein so that there is no opportunity for disarrangement of the tucks and each pat will be covered smoothly with the liner strip. The circuit which the tips of the tucker blades follow is shown by the dot-and-dash line D in Fig. 3. Involved in this is the novel method having for its essential feature the introduction of the pats into the pockets between the folds C in Fig. 3 while holding the pockets extended.

Given a mold cell adapted to have a flexible strip extended across its mouth and then bent into the cell to form a pocket in the strip, the invention contemplates the combination therewith of means to introduce plastic material to be packaged into the pocket when so formed, means (as a tucker blade 17) movable to a position in the cell in which it is engaged with the pocket at the bend therein, and means (here in the form of a spring, 18) to hold the first means in said position while the material is introduced. Actually, the first-named means in the present example bends the strip to form the pocket or tuck and in its said position of engagement with the bend in the pocket it coacts with the cell-mouth to hold the pocket in a state of tension.

Given a support (here wrapper A, itself supported by table 1) presenting a top surface, it is new in this art to maintain a flexible strip, bent on substantially parallel transverse lines to form a pocket between the bends, with one longitudinal edge of the strip presented to said surface, and then slide plastic material into the pocket over said surface.

I claim:

1. In combination, with a fixed support and a mold having mold spaces and the mouths of such spaces open in a given direction, mechanism to tuck into said spaces a flexible strip extended across said mouths comprising a carrier and a plurality of tuckers movable in the carrier in the opposite direction from positions outwardly of the strip and opposite the respective mouths in paths extending through the respective spaces, said carrier being confined by said support to move crosswise of said paths.

2. In combination, with a fixed support and a mold having mold spaces and the mouths of such spaces open in a given direction, a carrier confined by the support to move in a direction angularly related to the first direction and then back, and tuckers arranged in the carrier, said tuckers when the carrier has been moved back being movable therein, from positions opposite the respective mouths and outwardly of a flexible strip extended across said mouths, through said spaces in given paths and on movement of the carrier in the second direction and then back being movable in the carrier back to their said positions.

3. In combination, with a fixed support and a mold having mold spaces and the mouths of such spaces open in the same direction, mechanism to tuck into said spaces a flexible strip extended across said mouths comprising a plurality of tuckers and means confining the tuckers to move from positions outwardly of the strip and which are opposite the respective mouths in paths extending through the respective spaces and then back to said positions in paths distinct from the first paths.

4. In combination, with a fixed support and a mold having mold spaces and the mouths of such spaces open in the same direction, mechanism to tuck into said spaces a flexible strip extended across said mouths comprising a plurality of flat tuckers each having a flat face thereof facing in said direction and means confining the tuckers to move from positions outwardly of the strip and which are opposite the respective mouths in paths extending through the respective spaces and then back to said positions in paths distinct from the first paths.

5. In combination, with supporting structure and a mold having mold spaces and the mouths of such spaces opening in the same direction, mechanism to tuck into said spaces a flexible strip extended across said mouths comprising a plurality of tuckers movable from positions outwardly of the strip and opposite the respective mouths into said spaces, and a controller controlling the movements of the tuckers and shiftable past them in succession.

6. In combination, with supporting structure and a mold having mold spaces and the mouths of such spaces opening in the same direction, mechanism to tuck into said spaces a flexible strip extended across said mouths comprising a plurality of tuckers normally urged from positions outwardly of the strip and opposite the respective mouths into said spaces, and a controller obstructing the normal movements of the tuckers and shiftable past them to free them in succession.

7. In combination, with a fixed support and a mold having mold spaces and the mouths of such spaces open in a given direction, a carrier confined by the support to move in a direction angularly related to the first direction and then back, tuckers arranged in the carrier, said tuckers when the carrier has been moved back being movable therein, from positions opposite the respective mouths and outwardly of a flexible strip extended across said mouths, through said spaces in given paths and on movement of the carrier in the second direction and then back being movable in the carrier back to their said positions, and means to move the tuckers from and back to their said positions.

8. In combination, with a fixed support and a mold having mold spaces and the mouths of such spaces open in a given direction, a carrier movable on the support in a direction angularly related to the first direction and then back, tuckers arranged in the carrier, said tuckers when the carrier has been moved back being normally urged therein, from positions opposite the respective mouths and outwardly of a flexible strip extended across said mouths, through said spaces in given paths and on movement of the carrier in the second direction and then back being movable in the carrier back to their said positions, and means to temporarly hold the tuckers in said positions when the carrier is back and at that time release them in succession.

9. The combination, with a support having a top surface, of a mold carried by the support above said surface and being open at the side thereof facing said surface and having the mouth of its mold space at a side of the mold facing in a direction angularly related to the direction in which the first side faces, means to tuck a flexible strip extended across said mouth into said space and thus line the latter, and means to introduce into the thus-lined space the article to be contained in the same and leave it supported by said surface.

10. The combination, with a support having a top surface, of a mold confined by the support to move above said surface and being open at the side thereof facing said surface and having the mouth of its mold space at another side of the mold, means to tuck a flexible strip extended across said mouth into said space and thus line the latter, and means to introduce into the thus-lined space the article to be contained in the same and leave it supported by said surface, the first means being movable on the support to clear the article when introduced and connected with the mold to withdraw it from the article and tucked part of the strip on such movement thereof.

11. In the art of packaging plastic pats or the like, the method of shaping a strip of flexible sheet material to form tucks therein to receive the pats which consists in extending the strip across the spaces of a mold having a succession of such spaces open at one side of the mold, then bending the strip into the spaces successively of the latter to form therein pockets and on each such bending holding all of the previously formed pockets in a state of tension in the spaces containing such pockets, and while the pockets are so held introducing plastic material thereinto.

12. The method herein described which consists in maintaining a flexible strip, bent on substantially parallel transverse lines so as to form a pocket between the bends, with one longitudinal edge of such strip presented to a flexible wrapper supported so as to extend in a substantially horizontal plane and sliding plastic material into the pocket and upon the upper surface of said wrapper.

13. The combination, with a mold cell adapted to have a flexible strip extended across its mouth and then bent into the cell to form a pocket in the strip, of means to introduce plastic material into the pocket when so formed, means movable to a position in which it is engaged with the pocket at the bend therein, and means movable to hold the first means in said position while the material is introduced.

14. The combination, with a mold cell adapted to have a flexible strip extended across its mouth and then tucked into the cell, of means to introduce plastic material into the tuck when so formed, and means movable to tuck the strip into the cell and thereupon coactive with the mouth-portion of the latter to hold the tuck in a state of tension while the material is introduced.

15. The combination, with a pluri-celled mold having its cells arranged in a row and their mouths open in the same general direction, said mold being adapted to have a flexible strip extended across its cell mouths and then bent into the cells to form pockets in the strip, means to introduce plastic material into the pockets when so formed, a series of successively acting means movable to positions in which said means engage the respective pockets at the bends therein, and means to hold each of the first means in its said position while the material is introduced.

16. The combination, with a pluri-celled mold having its cells arranged in a row and their mouths open in the same general direction, said mold being adapted to have a flexible strip extended across its cell mouths and then tucked into the cells, means to introduce plastic material into the tucks when so formed, and a series of successively acting means movable to tuck the strip into the respective cells and thereupon coactive with the mouth-portion of the latter to hold the tucks in a state of tension while the material is introduced.

HERBERT RUMSEY, Jr.